Figure 1:
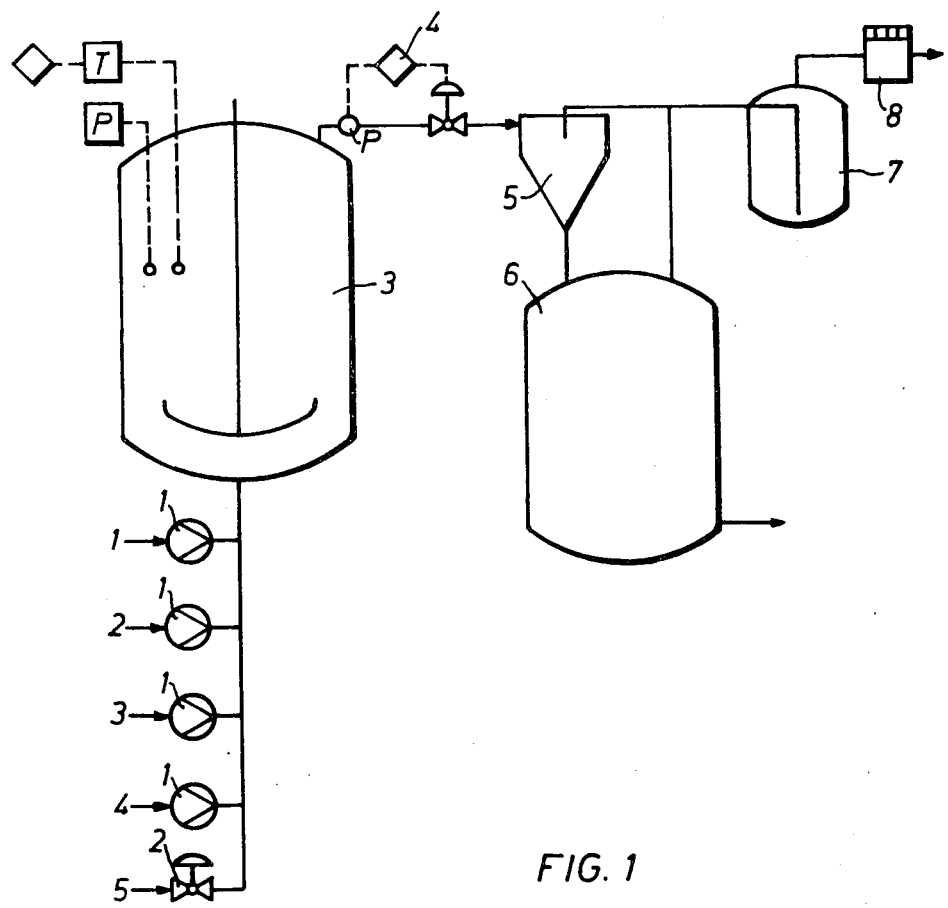

United States Patent [19]

Schmidt et al.

[11] 3,929,706
[45] Dec. 30, 1975

[54] CONTINUOUS PROCESS FOR THE PRODUCTION OF COPOLYMER DISPERSIONS

[75] Inventors: Adolf Schmidt, Cologne; Herbert Bartl, Odenthal-Hahnenberg; Heinrich Meckbach, Leverkusen, all of Germany

[73] Assignee: Bayer Aktiengesellschaft, Germany

[22] Filed: Feb. 22, 1974

[21] Appl. No.: 444,753

[30] Foreign Application Priority Data
Feb. 24, 1973   Germany.............................. 2309368

[52] U.S. Cl. ..... 260/29.6 TA; 260/17 R; 260/17 A; 260/17.4 ST; 260/29.6 T; 260/95 C
[51] Int. Cl.² .......................................... C08L 23/08
[58] Field of Search...... 260/29.6 T, 29.6 TA, 95 C, 260/17 R, 17.4 ST, 17 A

[56] References Cited
UNITED STATES PATENTS

| | | | |
|---|---|---|---|
| 2,703,794 | 3/1955 | Rooedel ....................... | 260/29.6 TA |
| 3,265,654 | 8/1966 | Glabisch et al.............. | 260/29.6 TA |
| 3,297,618 | 1/1967 | Glabisch et al.............. | 260/29.6 TA |
| 3,428,582 | 2/1969 | Deex ........................... | 260/29.6 TA |
| 3,632,542 | 1/1972 | Fox et al. ..................... | 260/29.6 T |
| 3,639,326 | 2/1972 | Kray et al...................... | 260/29.6 T |
| 3,665,060 | 5/1972 | Bergomi, Jr. et al......... | 260/29.6 TA |
| 3,668,165 | 6/1972 | Bergmeister et al. ......... | 260/29.6 T |
| 3,689,447 | 9/1972 | Makower ...................... | 260/29.6 T |
| 3,714,105 | 1/1973 | Stehle et al................... | 260/29.6 TA |
| 3,816,363 | 6/1974 | Wicht et al................... | 260/29.6 TA |
| 3,830,761 | 8/1974 | Lenney........................ | 260/29.6 TA |

*Primary Examiner*—Eugene C. Rzucidlo
*Attorney, Agent, or Firm*—Connolly and Hutz

[57] ABSTRACT

Continuous process for the production of film-forming dispersions of copolymers containing copolymerized units of 10 to 30% by weight of ethylene, 20–89% by weight of vinyl chloride, 0 to 69% by weight of vinyl acetate and 1 to 6% by weight of at least one hydrophilic monomer containing at least one —$SO_3Me$, —O—$SO_3Me$, —COOMe or —$CONH_2$ group (Me = H, Na, Kor, $NH_4$) said copolymer dispersions being stable to shearing forces, electrolytes, pigments and storage and suitable as binders for interior and exterior paints.

9 Claims, 1 Drawing Figure

CONTINUOUS PROCESS FOR THE PRODUCTION OF COPOLYMER DISPERSIONS

This invention relates to a continuous process for the production of copolymer dispersions having high solids contents from copolymerised units of vinyl chloride, ethylene and hydrophilic monomers and, optionally, vinyl acetate as well, using a combination of special process measures.

It is known that stable, emulsifier-free dispersions with a solids content of from 15 to 45% by weight can be produced by the continuous emulsion polymerisation of ethylene, vinyl chloride and polymerisable acid monomers, such as maleic acid semi esters, and optionally vinyl acetate (cf. British Pat. Specification No. 1,297,215). According to page 3, lines 1 to 10 and the Example 7 of this Specification, small quantities (up to 2% by weight, based on polymer) of conventional emulsifiers can also be used for adjusting the latex particles to a certain grain size.

Although 15 to 45% dispersions produced by this process are sufficiently stable to mechanical and thermal stressing and also to the effect of electrolytes, they show a pronounced tendency towards sedimentation, depending upon the period of storage, so that after only a few weeks considerable quantities of polymer settle on the bottom of the storage vessel. Due to plasticity of the parent polymers, the polymer particles of the initially still redispersible sediment are able to melt irreversibly (agglomerate) over a period of time by means of a process which is able to progress up to coagulation of the entire dispersion. Accordingly, dispersions of this kind can only be stored for prolonged periods in containers equipped with a stirring mechanism or with recirculating pumps.

In addition, the dispersions referred to in the abovementioned Specification are not stable to freezing and thawing and, in order to adjust the standard solids content of around 50% by weight, have to be subsequently concentrated by creaming, which is uneconomical and gives rise to effluent problems. On the other hand, attempts to produce dispersions having solids contents of from 50 to 60% by weight by direct polymerisation with the conventional process result in the formation of coarsely particulate dispersions containing microcoagulate ("specks") and having an even lower stability in storage. In addition, it is extremely difficult in this case to carry out polymerisation continuously on account of wall-coating and coagulate formation in the reactor.

Accordingly, an object of the invention was to find a particularly economic, satisfactorily reproducible process which gives copolymer dispersions of uniform quality coupled with high-grade service properties.

The process should give high monomer conversions and high-volume time yields. There should be no wall-coating and coagulate formation in the reactor. The dispersions directly obtained should have a high solids content (preferably more than 50% by weight) and, at the same time, as low a viscosity as possible without any need for special measures to be taken in this direction. Another requirement was a wide molecular weight distribution ($\eta$ -values of 0.2 to 1.3 [100 ml/g], as measured in tetrahydrofuran at $t = 25°C$), and a wide latex-particle diameter distribution (latex-particle diameter approximately 0.06 to 1.0 $\mu$), so that an extremely compact ball packing can be formed from relatively small and relatively large particles. In addition, the dispersions should be stable to freezing and thawing and also stable in storage. Their stability with respect to shearing, electrolytes and pigments should also be improved as far as possible. Naturally, the basically known service properties, such as good pigment-binding capacity of the dispersions, the favourable mechanical values, the high scrubbing and abrasion resistance and the high weather resistance and waterproof properties of the coatings produced from the dispersions should also remain substantially intact and, where possible, should even be improved.

This object was achieved by virtue of the fact that the monomers used in accordance with the invention are copolymerised in emulsion in a continuous process using a combination of special process stages which were known as individual stages in polymerisation technology. It had not been foreseen that the special combination of the abovementioned various measures would result in optimisation of the process according to the invention.

According to general interpretation, sedimentation and creaming are governed by the difference in density between the latex particles and the liquid phase, their flow resistance and the particle size of the latex particles (cf. H. Reinhard in "Dispersions of synthetic high polymers, part II, Application", Reihe Chemie, Physik und Technologie der Kunststoffe in Einzeldarstellungen 14, Springer-Verlag, Berlin-Heidelberg-New York, 1969, page 8). Accordingly, for a given difference in density between latex particles and liquid phase and with a predetermined latex particle size, the only remaining possibility for avoiding undesirable sedimentation is to increase the flow resistance of the liquid phase. The easiest way of doing this is to add water-soluble thickeners to the non-storage-stable dispersions. However, it is this very measure which, as a rule, accelerates the sedimentation process and which results in undesirable phase separation, micro-flocculations and the like. Even the obvious measure of improving stability in storage of the dispersions by reducing their latex-particle diameter, which could be done by increasing the proportion of anionic emulsifiers to be used during polymerisation, has proved to be substantially ineffectual in the present case.

In the process according to the invention, in contrast to conventional processes, the particle size is slightly increased although, surprisingly, there is no sedimentation. Stability in storage is considerably improved without any appreciable increase in the viscosity of the dispersions. The dispersions according to the invention are inter alia readily stirrable, generally have flow-out times of from 13 to 30 seconds from the cup with a 4 mm diameter nozzle according to DIN 53 211 (100 cc of dispersion, measuring temperature +20°C) and, in this way, differ distinctly from conventional protective colloid dispersions which have the consistency of a paste. The high stability of the dispersions produced in accordance with the invention to freezing and thawing was also surprising. Other advantages of the dispersions prepared in accordance with the invention will become apparent from the following.

The present invention provdes a continuous process for the production of an aqueous, film-forming dispersion, having a solids content of from 45 to 60% by weight and which are stable to shearing, electrolytes, pigments and storage, in which 10 to 30% by weight, preferably 15 to 22% by weight, of ethylene;
20 to 89% by weight, preferably 45 to 77% by weight, of vinyl chloride;
0 to 69% by weight, preferably 0 to 39% by weight, of vinyl acetate; and
1 to 6% by weight of at least one hydrophilic monomer containing at least one —$SO_3$Me, —O—$SO_3$Me, —COOMe, —$CONH_2$, [Me = H,Na, K or $NH_4$] group attached through a carbon atom, the percentage contents together totalling 100, are copolymerised in an aqueous dispersion at pH values of from 3.5 to 8.5, at temperatures of from 40° to 80°C and at pressures of from 50 to 200 atms. in the presence of a water-soluble radical former and, optionally, other polymerisation aids in a continuously traversed and agitated reactor or reaction tube (or several such reactors or reaction tubes arranged one behind the other), with the characteristic feature that copolymerisation of the monomers is carried out in the presence of:

a. 0.5 to 2.5% by weight of anionic emulsifiers, based on the quantity of water to be added per unit of time;
b. 0.05 to 1.5% by weight of protective colloids, based on the quantity of water to be added per unit of time; and
c. 0.1 to 2.5% by weight of water-soluble radical-forming initiators or redox systems, based on the quantity of water to be added per unit of time, and in which
d. the average residence time, which is defined as the ratio between the quantity by weight of reaction mixture in the reactor to the quantity of reaction mixture removed per hour, is from 2 to 30 hours, preferably from 5 to 10 hours,
e. the ratio by weight of the quantity of ethylene introduced per unit of time to the total quantity of monomers to be introduced per unit of time, including ethylene, amounts to between 0.1 : 1 and 0.65 : 1 and preferably to between 0.15 : 1 and 0.45 : 1,
f. the ratio by weight of the total quantity of vinyl chloride and vinyl acetate introduced per unit of time to the total quantity of water introduced per unit of time is within the range of from 0.5 : 1 to 1.5 : 1 and preferably within the range of from 0.8 : 1 to 1.2 : 1, and
g. the ratio of the volume of dispersion in the reactor to the total reactor volume is between 0.5 : 1 and 0.99 : 1 and preferably between 0.7 : 1 and 0.95 : 1.

Hydrophilic compounds copolymerisable with vinyl chloride, vinyl acetate and ethylene (cf. U.S. Pat. No. 3,265,654) include compounds corresponding to general formulae Ia and Ib with the proviso that they contain one or two of the hydrophilic groups defined above:

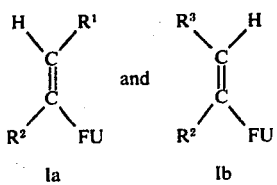

Ia    Ib in which
$R^1$ = H, —$CH_3$ or —COOMe;
$R^2$ = H, —$CH_3$ or —$CH_2$—COOMe;
$R^3$ = H, —$CH_3$ or —COOMe;
FU = —COOMe, —$CONH_2$, —$CONHR^4$, —$COOR^5$, —CO—X—$CR^6R^7$ — $(CH_2)_n$—Y—Me—, —$SO_3$Me or —$CH_2$—$SO_3$Me;
in $R^1$, $R^2$, $R^3$ and FU, Me represents H, Li, Na, K or $NH_4$, whilst in FU
$R^4$ is a linear or branched alkyl radical having 1 to 5 carbon atoms;
$R^5$ is a linear or branched alkyl radical having 1 to 12 carbon atoms or a cycloalkyl radical having 6 carbon atoms;
$R^6$ is H or a linear or branched alkyl radical having 1 to 12 carbon atoms (the sum of the carbon atoms in $R^6$ and $R^7$ being less than 18);
$R^7$ is H, a linear or branched alkyl radical having 1 to 12 carbon atoms (the sum of the carbon atoms in $R^6$ and $R^7$ is less than 18);
X is a two-bond bridge atom or a two-bond atomic group, preferably —O—, —NH— or —NR—;
Y is a hydrophilic anionic group, preferably —$SO_3$—, —$OSO_3$— or —COO—; and
n is 0 or an integer of from 1 to 6.

The following copolymerisable hydrophilic components are mentioned by name: alkali-, ammonium-, amine- and diethanolamine salts of maleic acid, fumaric acid and itaconic acid; semi ester salts of the aforementioned dicarboxylic acids with alcohol components containing 1 to 12 carbon atoms; acrylamide; N-alkylated acrylamides; vinyl sulphonic acid; methallyl sulphonic acid and alkali salts and ammonium salts of these sulphonic acids; also substances which can be regarded as acylation products of hydroxyalkyl sulphates, aminoalkyl sulphonates, aminoalkyl sulphates, N-alkylaminoalkyl sulphates, hydroxy alkyl carboxylic acids, aminoalkyl carboxylic acids, N-alkyl aminoalkyl carboxylic acids, with acrylic acid, methacrylic acid or crotonic acid. The alkali or ammonium salts of 2-N-(meth)-acrylamido-2-methyl propane sulphonic acid may be mentioned as example.

It is preferred to use maleic acid or its alkali or ammonium salts, maleic acid semiesters having 1 to 12 carbon atoms in the alcohol component, especially maleic acid cyclohexyl semi ester and corresponding alkali and ammonium salts, 2-N-(meth)-acrylamido-2-methyl propane sulphonic acid and the corresponding alkali and ammonium salts.

The following compounds can be used as anionic emulsifiers: alkali or ammonium alkyl benzene sulphonates (R—$C_6H_4$—$SO_3$—salts) having about 10 to 18 carbon atoms in the linear or branched alkyl radical, or mixtures thereof; alkali or ammonium alkylsulphonates having 8 to 20, preferably 10 to 18, carbon atoms in the linear or branched alkyl radical, or mixtures thereof; alkali or ammonium salts of sulphosuccinic acid esters (ROOC—$CH_2$—CH($SO_3$H)—COOR) having 8 to 18 carbon atoms, preferably 8 to 12 carbon atoms in the alcohol component, or mixtures thereof; fatty alcohol sulphates of the formula R — O — $SO_3$Me, where R represents a linear or branched alkyl radical with 10 to 18 carbon atoms, Me is an alkali ion or ammonium ion $NR_4'$ (where R' = H, alkyl with 1 to 6 carbon atoms, —$CH_2$—$CH_2$—OH). However, it is also possible to use fatty alcohol sulphates or fatty alcohol sulphate mixtures with predominantly or exclusively secondary alkyl sulphates; sulphates of substituted polyglycol ethers, especially sulphates of fatty alcohol adducts of the general formula

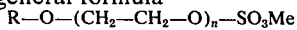
R—O—(CH$_2$—CH$_2$—O)$_n$—SO$_3$Me or sulphates of alkylphenol adducts of the general formula

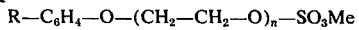
R—C$_6$H$_4$—O—(CH$_2$—CH$_2$—O)$_n$—SO$_3$Me or sulphates of fatty acid amide adducts of the general formula

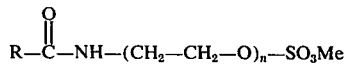

$$R-\overset{O}{\underset{\|}{C}}-NH-(CH_2-CH_2-O)_n-SO_3Me$$

or sulphates of fatty acid adducts of the general formula

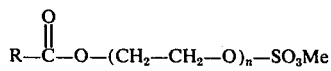

$$R-\overset{O}{\underset{\|}{C}}-O-(CH_2-CH_2-O)_n-SO_3Me$$

where R is a linear or branched alkyl radical having 8 to 20 carbon atoms, $n$ is an integer of from 3 to 15, preferably from 3 to 10, and Me is an alkali metal or ammonium ion.

In the above general formulae and in all the compounds mentioned by name, "ammonium" always means NH$_4$ unless otherwise stated.

It is preferred to use sodium lauryl sulphate, alkali or ammonium salts of sulphated alcohols produced from coconut fat (a mixture of linear even-numbered C$_8$–C$_{18}$ alcohols, especially a mixture of linear, even-numbered C$_8$–C$_{18}$ alcohols with a predominant proportion of lauryl alcohol), sulpho-succinic acid dioctyl esters (alkali salts), mixtures of paraffin sulphonates with average chain lengths of from 12 to 18 carbon atoms (alkali salts) and sulphates of polyglycol ethers (R—O—(CH$_2$—CH$_2$—O—)$_n$ SO$_3$-alkali, where R = C$_{12}$–C$_{18}$ and $n$ = 3–10.

The anionic emulsifiers are used in quantities of from 0.5 to 2.5% by weight and preferably in quantities of from 0.8 to 1.5% by weight, based on the quantity of water added per unit of time.

The following represent suitable protective colloids for the process according to the invention:

Synthetic polymers such as polyvinyl alcohols, partially hydrolysed polyvinyl acetate (degree of hydrolysis approximately 88 to 98), poly(meth)acrylic acid and its salts, polyvinyl pyrrolidones, salts and derivatives of olefin-maleic acid anhydride copolymers such as, for example, reaction products of alkali liquors, ammonia, amines or ethanolamine with copolymers of maleic acid anhydride and ethylene, isobutylene or styrene, polyacrylamides; cellulose derivatives which dissolve in water to form 0.05 to 1.5% by weight solutions at temperatures of from 40 to 80°C, such as methyl celluloses, methylethyl celluloses, carboxymethyl celluloses, hydroxyethyl celluloses, methylhydroxyethyl celluloses, hydroxypropylmethyl celluloses; natural substances such as vegetable rubber (for example gum arabic), alginates and the like.

Hydroxyethyl celluloses with a degree of substitution of about 1.8 to 2.5, preferably with a degree of substitution of 2.5, are preferably used as the protective colloids.

Although both high molecular weight and also low molecular weight hydroxyethyl celluloses are suitable for use in the process according to the invention, preference is given to the types which have an average viscosity (2% Brookfield viscosity at $t = 25°C$) of about 300 to 6000 cP.

Partially hydrolysed polyvinyl acetates with a degree of hydrolysis of around 88 which, in the form of a 4% aqueous solution, have a viscosity of from 4 to 70 cP at $t = 20°C$, as measured in Hoppler's ball-drop viscosimeter or in accordance with DIN 53 015, or mixtures thereof.

The protective colloids are used in quantities of from 0.05 to 1.5% by weight and preferably in quantities of from 0.2 to 0.8% by weight, based on the quantity of water added per unit of time. These protective colloids dissolve in water to form 0.05 to 1.5% by weight solutions, even at temperatures of from 40° to 80°C.

Initiators suitable for use in the process according to the invention include water-soluble inorganic peroxide compounds, for example peroxy disulphates (such as ammonium, sodium or potassium peroxy disulphates) and/or hydrogen peroxide. However, it is also possible to use water-soluble activators of the azodinitrile, peroxy acids, peroxy ester, diacyl perioxides, peroxy mono- and peroxy dicarboxylic acid ester, of the dialkyl and diaryl peroxide and of the alkyl hydroperoxide type, which have adequate solubility in water through suitable substitution with hydrophilic groups.

In addition to the aforementioned peroxide compounds, it is possible to use reducing substances to accelerate polymerisation (redox activation), especially at polymerisation temperatures below +70°C. Substances suitable for this purpose include sulphur compounds with a low oxidation state such as sulphites, hydrogen sulphites, meta bisulphites, thiosulphates, formaldehyde sulphoxylates, sulphinic acids; reducing nitrogen compounds such as hydroxylamine and hydroxylammonium salts, hydrazine and hydroxylammonium salts, polyamines; and, finally, reducing saccharides such as sorbose, glucose, fructose or endiols, such as ascorbic acid.

The quantity in which the initiators are used amounts to from 0.1 to 2.5% by weight and preferably to from 0.5 to 1.5% by weight, based on the quantity of water introduced per unit of time. Together with the temperature, it determines the molecular weight and molecular weight distribution of the copolymers and, for a given input of ethylene and at a fixed ethylene pressure, also has an influence upon the quantity of ethylene incorporated, large additions of activator promoting the incorporation of ethylene and giving rise to the formation of low molecular weight polymers.

In cases where reducing substances are also used, the ratio of peroxide compound to reducing agent has to be adapted in such a way that the dispersion leaving the reactor still contains small quantities of free peroxide compound (approximately 0.025 to 0.05% by weight). If this is not the case, the entire contents of the autoclave may coagulate through the accumulation of residual monomers in the reactor.

In addition, the activator system can be further sensitised with heavy metal compounds, preferably in the form of metal chelate complexes, iron, cobalt, molybdenum, nickel and cerium representing suitable heavy metals. Preferred complex formers include ethylene diamine, diethylene tetramine, triethylene tetramine or carboxymethylhydroxyalkyl-, carboxymethyl derivatives of ammonia, ethylene diamine, diethylene tetramine, for example nitrilo triacetic acid and ethylene diamine tetra acetic acid.

The function of the buffer substances used in the process according to the invention is to maintain a pH value of from 3.5 to 8.5, a pH value of from 3.5 to 6.0 being preferred for the polymerisation of monomer mixtures rich in vinyl acetate, whilst a pH value of from 6.0 to 8.5 is preferred for monomer mixtures rich in vinyl chloride.

The quantity in which the buffer substances are used is governed by the type and quantity of peroxides, reducing substances and hydrophilic comonomers used. In most cases, alkaline reaction additives have to be used on account of the $H_3O^+$ -ions formed, for example, during the decomposition of peroxy disulphate. Additives of this kind include alkali hydroxides, alkali salts of carbonic acid, ammonium, borax (only where hydroxyethyl cellulose is used), alkali phosphates and alkali acetates.

The polymerisation temperature is in the range of from +40° to +80°C and preferably in the range of from 40° to 70°C, depending upon the particular activator system used. Where polymerisation is carried out in the absence of reducing additions, it is advisable to select a temperature of at least +60°C. Temperatures of from +70° to +75°C. are optimal for an activator system based solely on peroxy disulphate.

The vinyl chloride-ethylene or vinyl chloride-vinyl acetate-ethylene copolymer dispersions can be continuously prepared, for example, in an apparatus of the kind diagrammatically illustrated in FIG. 1.

In FIG. 1, the reference 3 denotes a stainless steel autoclave which is equipped with a stirrer, a temperature-measuring and regulating system [T], a monometer [P] and valves in its base and cover. Heat is dissipated through a thermostat connected to the outer cooling jacket of the autoclave.

Aqueous solutions and liquid monomer (vinyl acetate, liquid vinyl chloride) can be introduced by means of metering pumps through the capillary stream 1–4. At the same time, ethylene is introduced through the throughflow-controlled valve 2. The pressure-controlled valve 4 is adjusted in such a way that the reactor is kept in the required pressure range by venting. The pressure-controlled valve 4 may optionally be followed by an outlet which is closed when valve 4 is open and open when valve 4 is closed.

The reaction mixture issuing through the valve 4 passes through a temporable cyclone 5 and, in the vessel 6, separates into the crude dispersion and a gas stream, which is run off through the separator 7 (optionally cooled with brine) and a gas meter 8 for working up the residual monomer.

The crude dispersion can be continuously removed from the vessel 6 and delivered in vacuo to a second cyclone degassing stage.

According to FIG. 1, the streams 1 to 5 are delivered to the base of the autoclave and the dispersion is removed from the head of the autoclave. However, it is also possible to deliver streams 1 to 5 to the head of the autoclave and to remove the dispersion from the bottom of the autoclave. It is possible, with this procedure, to obtain even higher monomer conversions because it is only the proportion of monomers, especially ethylene, dissolved in the dispersion that can escape as exhaust gas. Accordingly, the input of ethylene has to be adapted in such a way that the level to which the reactor is filled remains constant. Measurements on the compressibility of the autoclave contents can be used to determine the filling level of the reactor. If the reactor is filled with aqueous dispersion to a high level, the rise in pressure accompanying the batch input of a specific quantity of ethylene will be sharper than that obtained when the same quantity of ethylene is added with the reactor filled to a low level with dispersion.

In the process according to the invention, the type of stirrer used must be selected in such a way as to guarantee thorough, intimate admixture of the entire contents of the autoclave.

Admixture of the dispersion in the reactor can be assisted by additional fittings, such as wave breakers and the like.

In cases where it is desired to obtain dispersions having a relatively narrow distribution of dispersion particle diameter, readmixture of the dispersion can be counteracted through the incorporation of suitable baffles which divide the reactor into individual, separately admixed chambers.

For a given input of ethylene, vinyl chloride and vinyl acetate, the quantity of ethylene incorporated into the copolymer is governed essentially by pressure. In many cases, a high input of ethylene does not result in the required incorporation of ethylene unless sufficiently high pressures are applied. On the other hand, a high pressure does not have any effect unless sufficient quantities of ethylene are available. Since the filling level of the autoclave is governed by the quantity of ethylene introduced per unit of time for a given ethylene pressure, the incorporation of ethylene is influenced by the level to which the reactor is filled with aqueous dispersion for a given ethylene pressure.

In addition, the incorporation of ethylene into the copolymer is governed by the average residence time of the reaction mixture in the reactor, by the amount of activator introduced, by the polymerisation temperature, by the intensity of admixture and by the type and quantity of the particular emulsifier and dispersant system. Increasing proportions of emulsifier make the ethylene easier to incorporate into the copolymer.

If the average residence time is defined as being the ratio:

$$t_m = m/\dot{m}$$

$m$ being the quantity of reaction mixture in the reactor in parts by weight and $\dot{m}$ the quantity of reaction mixture removed per hour [in parts by weight], residence times of $$t_m = 2 \text{ to } 30 \text{ hours,}$$

preferably 5 to 10 hours, are characteristic of the process according to the invention.

The ratio $q$ of the total quantity of vinylchorlide and vinyl choride-vinyl acetate introduced per unit of time to the total quantity of water introduced per unit of time:

$$q = \frac{m_{VCl} + m_{Vac}}{m_{H_2O}}$$

is from 0.5 to 1.5 and preferably from 0.8 to 1.2 in the process according to the invention.

For a given ethylene pressure and for a given input of vinyl chloride or vinyl chloride and vinyl acetate, the quantity of ethylene to be introduced into the reactor per unit of time is primarily governed by the quantity of ethylene which the copolymer is required to contain. In general, it is not sufficient to introduce ethylene in only that quantity which is theoretically required for synthesising the required copolymer, because an ethylene conversion of approximately 100% is only obtained in cases where very low ethylene contents are sufficient for the copolymer. However, copolymer dispersions with a predominant vinyl chloride component are only film-forming when they contain at least 10 to 15% by ethylene in the copolymer.

For a given temperature, the ethylene excess to be offered will have to be greater, the greater the quantity of ethylene to be incorporated into the copolymer, the richer the monomer mixture introduced is in vinyl chloride and the lower the pressures at which the process according to the invention is carried out.

The ratio of the quantity of ethylene to be introduced per unit of time to the total quantity of monomer, including ethylene, to be introduced per unit of time can vary within the limits:

$$\frac{m_{C_2H_4}}{m_{VCl} + m_{Vac} + m_{C_2H_4} + m \text{ hydrophilic monomer}} = 0.1 - 0.65$$

in the process according to the invention at pressures in the range of from 50 to 200 atms. However, it is best to keep within the narrower range of from 0.15 to 0.45 because the conversions of vinyl chloride and vinyl acetate diminish with increasing ethylene input.

In addition, the input of ethylene should not be so great that the filling level of the autoclave steadily decreases during operation. The ratio $f$:

$$f = \frac{\text{volume of the dispersion in the reactor}}{\text{reactor volume}}$$

should not fall below the value 0.5 and should not exceed the value 0.99, and is kept as constant as possible in the range of from 0.7 to 0.95 through suitable regulating measures.

An autoclave cascade, for example with 2 to 6 autoclaves, optionally staggered in size, can also be used as the reaction system in the process according to the invention. In this case, the aqueous phase and the monomers can be introduced into the first autoclave from which the reaction mixture then flows into the individual reactors. However, it can also be distributed among the individual reactors in such a way that a comparable monomer conversion per unit of time is obtained in each reactor, which is more favourable for uniform heat dissipation.

The copolymerisation reaction can also be carried out with considerable advantage in a closed pipe system (mixing circuit) with recirculating pumps ($n$) under the claimed conditions. The pipes can have cross-sections of from about 1 to 100 cm.

The dispersions produced by the process according to the invention have solids contents of from 45 to 60% by weight, preferably from 50 to 58% by weight.

The polymer particles present in the dispersions have diameters of about 0.06 to 2 $\mu$, preferably 0.06 to 1.5 $\mu$. The dispersions have a wide latex-particle diameter distribution.

The copolymers of the dispersions have $\eta$-values (intrinsic viscosity) of from 0.2 to 1.3 dl/g, as measured in tetrahydrofuran at $t = 25°C$. These intrinsic viscosities are a measure of average molecular weight.

The copolymers are substantially statistical in structure, as shown by the results of fractionation tests.

The properties of the dispersions produced in accordance with the invention can be varied within wide limits a. through the chemical and quantitative composition of the copolymers;
b. through the molecular weight of the copolymers; and
c. through the latex-particle diameter distribution.

Accordingly, the dispersions produced in accordance with the invention also have a very wide range of applications.

Thus, the resistance of the clear films produced from the dispersions to alkalis is better, the greater the number of vinyl chloride and ethylene units and the smaller the number of vinyl acetate units present in the corresponding copolymer. On the other hand, an increasing vinyl acetate content in the copolymer produces greater adhesion and toughness. With a fixed vinyl chloride/vinyl acetate ratio, an increasing ethylene content reduces the dynamic solidification point of the copolymers (in the range of from 0 to 40% by weight of copolymerised ethylene, based on total polymer).

Table I shows how the dynamic solidification points of vinyl chloride-ethylene-maleic acid-cyclohexyl semi ester and vinylacetate-ethylene-maleic acid cyclohexyl semi ester copolymers change with increasing ethylene content of the copolymer. The dynamic solidification point was measured in accordance with Roelig-Heidemann (cf. DIN 53 513).

Table I

| % by weight of ethylene units in the copolymer | solidification point °C Copolymer: ethylene-vinyl chloride-MCH ⊕ | solidification point °C Copolymer: ethylene-vinyl acetate-MCH ⊕ |
| --- | --- | --- |
| 10 | approx. + 50 | approx. + 7 |
| 12.5 | approx. + 40 | approx. + 3 |
| 15.0 | approx. + 30 | approx. ± 0 |
| 17.5 | approx. + 25 | approx. − 2 |
| 20.0 | approx. + 20 | approx. − 5 |
| 22.5 | approx. + 13 | approx. − 7 |
| 23.0 | approx. + 10 | approx. − 7.5 |
| 25.0 | approx. + 5 | approx. − 9 |
| 27.5 | approx. ± 0 | approx. − 12 |
| 32.5 | approx. − 10 | approx. − 14 |
| 39.0 | approx. − 20 | approx. − 18 |

⊕MCH = maleic acid cyclohexyl semi ester, % by weight in copolymer: 3.5%

With a fixed vinyl chloride/vinyl acetate/MCH ratio, quaternary polymers with a certain dynamic solidification point can be adjusted through the ethylene content and, with a fixed ethylene content, through the MCH/vinyl chloride/vinyl acetate ratio. Within the range claimed, the hydrophilic component has only a negligible effect upon the dynamic solidification point.

The dynamic solidification point of the copolymers in turn substantially determines the film-forming temperature of the dispersions. Whereas the above vinyl acetate-ethylene dispersions containing approximately 10% by weight of copolymerised ethylene units form coherent films at room temperature, the corresponding vinyl chloride-ethylene copolymer dispersions (Table I) do not form films at room temperature. They only form films at temperatures above about +20°C if they contain at least 18% by weight of copolymerised ethylene. Naturally, this also applies to plasticiser-free systems.

The hardness of the copolymers at the particular measuring temperature is governed by their dynamic solidification point, i.e. for a comparable molecular weight and molecular weight distribution it is lower, the lower the solification point of the copolymers.

In order to illustrate this association, Table II shows, for example, the Shore A hardness values (according to DIN 53505) of MCH-vinyl chloride-ethylene copolymers produced by the process according to the invention in relation to the dynamic solidification point (as stated in Table I) at different measuring temperatures:

Table II

| dynamic solidification point (°C) (dynam. S) | Shore A at different temperatures (°C) | | | | |
|---|---|---|---|---|---|
| | −10 | ±9 | +20 | +40 | +60 |
| +30 | — | — | — | 72 | 40 |
| +20 | — | — | 92 | 56 | 28 |
| +10 | — | — | 76 | 36 | 15 |
| ±0 | — | 94 | 45 | 24 | 8 |
| −10 | 85 | 58 | 26 | 14 | 4 |
| −20 | 70 | 45 | 18 | 9 | — |

The MCH-vinyl chloride-ethylene copolymers to which Table II relates were prepared at temperatures of around 70°C and have intrinsic viscosities [η] of about 0.4 to 0.5 [dl/g, 25°C tetrahydrofuran (=THF)].

Another dependence of Shore A hardness on the dynamic solidification point is found in vinyl chloride-vinyl acetate-ethylene-MCH copolymers which have a molecular weight comparable with the above products in Table II (cf. Table III). Copolymer composition: % by weight of ethylene, as indicated in Table III, approximately 3.5% by weight of MCH, rest % by weight of vinyl chloride (VC1) + vinyl acetate (Vac), the ratio by weight of VC1 to Vac in the copolymer being 2 : 1.

For the same dynamic solidification point, the hardness of copolymers of the same analytical composition decreases with increasing measuring temperature more quickly, the lower the moleculare weight of the parent copolymer.

In Table IV, (A) represents a vinyl chloride-vinyl acetate-ethylene-MCH copolymer having a dynamic solidification point of +20°C, corresponding to an ethylene content of approximately 15% by weight in the copolymer with a vinyl chloride/vinyl acetate ratio of about 2 : 1 (parts by weight), approximately 3.5% by weight of MCH, with an intrinsic viscosity [η] of 0.4 (dl/g tetrahydrofuran 25°C); (B) is a copolymer of the same composition as (A) with a dynamic solidification point of +20°C and a viscosity [η] of 1.0 (dl/g tetrahydrofuran 25°C); (C) is a vinyl chloride-vinyl acetate-ethylene-MCH copolymer with a dynamic solidification point of +14°C, an ethylene content of approximately 18% by weight in the copolymer with a vinyl chloride/vinyl acetate ratio of about 2 : 1 (parts by weight), approximately 3.5% by weight of MCH with an intrinsic viscosity [η] of 0.4 (dl/g tetrahydrofuran 25°); (D) is a copolymer of the same composition as (C) with a dynamic solidification point of +14°C and an intrinsic viscosity [η] of 1.0 (dl/g tetrahydrofuran 25°).

Table IV

| Product | Dynamic S [°C] | [η] dl/g | Shore A hardness at different temperatures | | | | | | | |
|---|---|---|---|---|---|---|---|---|---|---|
| | | | +10 | +20 | +30 | +40 | +50 | +60 | +70 | +80 |
| (A) | +20 | 0.4 | 98 | 78 | 38 | 23 | 10 | 5 | — | — |
| (B) | +20 | 1.0 | 95 | 75 | 68 | 65 | 62 | 58 | 55 | 50 |
| (C) | +14 | 0.4 | 95 | 50 | 25 | 15 | 3 | — | — | — |
| (D) | +14 | 1.0 | 95 | 48 | 35 | 27 | 22 | 15 | 7 | — |

Table IV shows the marked influence of molecular weight upon the hardness of the particular copolymers of the same analytical composition. In this respect, the products differ from one another more greatly, the higher the dynamic solidification point (compare A with B and C with D).

Hitherto, nothing has been said of the dependence of the dynamic solidification point of vinyl chloride-vinyl acetate-ethylene-MCH copolymers upon the ethylene content on the one hand and upon the vinyl chloride/vinyl acetate ratio on the other hand. Table V shows the Table III

| Copolymer % by weight of ethylene | dynamic solidification point (°C) | Shore A hardness at different temperatures | | | | | |
|---|---|---|---|---|---|---|---|
| | | 0 | +10 | +20 | +30 | +40 | +50 |
| approx. 15 | +20 | — | 98 | 80 | 40 | 25 | 10 |
| approx. 17.5 | +15 | — | 96 | 54 | 27 | 15 | 4 |
| approx. 20 | +10 | 96 | 92 | 40 | 20 | 10 | 2 |
| approx. 22.5 | +5 | 90 | 78 | 23 | 12 | — | — |

Accordingly, for a comparable molecular weight and a comparable dynamic solidification point, products having an additional vinyl acetate component are softer (compare Table III with Table II).

dynamic solidification point of different copolymers as a function of their ethylene content with a vinyl chloride/vinyl acetate ratio of about 2 : 1 and 1 : 2. MCH-content of the copolymer: 3.5% by weight.

Table V

| Ethylene content of copolymer (% by weight) | 10 | 12.5 | 15 | 17.5 | 20 | 22.5 | 25 | 27.5 |
|---|---|---|---|---|---|---|---|---|
| | | | | dynamic solidification point (°C) | | | | |
| VCl/Vac = 2/1 | 34 | 26 | 19 | 15 | 10 | 5 | 1 | −4 |
| VCl/Vac = 1/2 | 20 | 15 | 10 | 6 | 3 | 0 | −4 | −8 |

VCl = vinyl chloride,
Vac = vinyl acetate.

In addition, the copolymers obtained by the process according to the invention can be characterised by the relation:

Intrinsic viscosity $[\eta]$ - melt index (DIN 53 735 at 125°C/ (25°C THF dl/g) 2.158 kp compression)

In Table VI, a certain melt-index range is associated with copolymers having a VCl/Vac ratio of about 2 : 1 and an ethylene content of 16 to 20% by weight and 3.5% by weight of MCH in dependence upon their intrinsic viscosity:

Table VI

| Intrinsic viscosity $[\eta]$ (dl/g 25°C THF) | 0.8–1.0 | 0.6–0.8 | 0.4–0.6 | 0.2–0.4 |
|---|---|---|---|---|
| Melt index | approx. 2 | 2–15 | 15–30 | 15–60 |

Accordingly, it is possible by virtue of the process according to the invention to produce a wide range of various polymer dispersions differing widely in their film-forming temperature and clear-film hardness and having a variety of different applications. The measures which have to be taken to obtain a dispersion based on vinyl chloride-ethylene hydrophilic component or on vinyl chloride-vinyl acetate-ethylene-hydrophilic component with a relatively low film-forming temperature coupled with extreme clear-film hardness, would appear to be clear to the expert from the foregoing teaching.

The copolymer dispersions produced by the process according to the invention only satisfy particular service requirements when the polymer on which they are based has certain properties. For example, it was not possible to predict what properties a vinyl chloride-vinyl acetate-ethylene copolymer should have to be suitable for the production of interior paints having a high wet rubbing strength with a pigmenting level of 1200 to 1300%.

It has now been found that this requirement is satisfied when the copolymer on which the dispersion is based, irrespective of its particular analytical composition, has a Shore A hardness of at least 50 (measured at +20C) and a melt index of at most 30. At the same time, the film-forming temperature of the corresponding dispersion should not exceed a value of +20°C.

To produce washing-resistant and scuff-resistant paints with a relatively low pigmenting level (interior paints: 800%, external paints 300 – 400%), it is also possible to use softer polymers; soft dispersions are also suitable for use as binders for paints on wood, as binders for paper coating compositions, for priming leather and for consolidating fibre-based nonwovens, etc.

Polymer dispersions suitable for a variety of different applications can readily be produced in one and the same apparatus through simple measures, for example by varying the input of ehtylene and/or by varying the ethylene pressure and/or by displacing the vinyl chloride/vinyl acetate ratio and/or by varying the temperature and/or by varying the activator input. It is also possible to switch directly from the production of a certain dispersion A to the production of a dispersion B without having to change the chemicals used for this purpose.

By virtue of the low boiling points of the monomers used and, above all, by virtue of their outstanding stability to shear forces and heat, the dispersions produced in accordance with the invention can readily be freed from residual monomers and, in contrast, for example, to acrylate dispersions or dispersions containing higher vinyl esters, are substantially free from odour after "degassing". The freedome from odour and the physiological acceptability of these dispersions constitute particular advantages in cases where they are processed in closed rooms. Since the film-forming temperature of the dispersions produced in accordance with the invention is generally of the order of +2° to +18°C, there is no need to add external plasticisers (which in many cases is not without physiological hazards).

External coatings on plaster, masonry, concrete, asbestos cement, wood, roof board and the like prepared with the dispersions according to the invention are highly weather resistant, chalking resistant and substantially non-soiling. Whereas, in conventional polymer dispersions for paints, optimum weather resistance is obtained with a pigmenting level of from 150 to 250% of pigment on binder (PVK 30–45), excellent weathering resistance is obtained with the dispersions according to the invention even with considerably higher pigmenting levels (PVK 50–60). Since extremely good elasticity and adhesion are also found to exist in the highly-pigmented films, it is possible inexpensively to produce good external dispersions having relatively high pigmenting levels. (PVK = relation between pigment, filler and binder volume, cf. Dispersionen synthetischer Hochpolymerer, H. Reinhard, 1969, page 46, Springer-Verlag Berlin).

By virtue of the low solidification point, the elasticity and the high resistance to alkalis of the copolymers on which the dispersions prepared in accordance with the invention are based, these dispersions can also be used as binders or additives for plasters, above all even on alkaline substrates such as concrete and masonry. The resistance of the dispersions according to the invention to electrolytes and shear forces enables plaster mortars of this kind to be prepared without difficulty.

It is also possible with the dispersions according to the invention to prepare a variety of different cement or anhydrite compositions. Even small additions of these dispersions are sufficient to improve the processibility and flow properties of these materials, and also significantly to improve their property spectrum in relation to that of materials produced without the dispersions. Thus, the mechanical strength of hardened gypsum and cement compositions produced with the dispersions is considerably increased and their susceptibility to cracking is reduced, with the result that these materials can be drilled, nailed, etc. without breaking, cracking or splintering. In addition, whereas gypsum and cement compositions prepared without the dispersions do not adhere to smooth substrates, cement or gypsum compositions prepared with dispersions produced in accordance with the invention adhere firmly to asbestos, cement, ceramics, steel, glass, plastics and wood.

Finally, the copolymer dispersions produced by the process according to the invention can be used for the production of screeds (for example floor screeds), as binders for paper coating compositions and for bonding a variety of different materials such as paper, hardboard, wood, plastics, metal foils, the low permeability to water vapour of copolymer films rich in vinyl chloride having an extremely favourable effect in this respect.

The dispersions prepared in accordance with the invention can also be used for consolidating nonwovens and for backing carpets. In addition to the above-mentioned monomers, comonomers containing crosslinker groups can be incorporated into the copolymers for improving the resistance to solvents (petrol, trichlorethylene and perchlorethylene) which consolidating agents used for nonwovens are required to show.

The following Examples illustrate the process according to the invention and characterise the dispersions prepared by the process according to the invention and their serviceability.

The percentage contents quoted in the Examples relate to weight unless other wise stated.

EXAMPLE 1

(Dispersion 1)

The following quantitative streams are introduced into a 40 liter capacity fine-steel autoclave (working pressure up to 100 atms.) through a valve in its base at a temperature of 70°C/80 atms.:

| | | |
|---|---|---|
| Stream 1 | 200.00 g/h | of water |
| | 20.00 g/h | of ammonium peroxy disulphate |
| Stream 2 | 1800.00 g/h | of water |
| | 100.00 g/h | of the sodium salt of maleic acid cyclohexyl semi ester (MCH) |
| | 15.00 g/h | of sodium bicarbonate |
| | 18.00 g/h | of sodium lauryl sulphate |
| | 16.00 g/h | of hydroxyethyl cellulose, degree of substitution 2.5, viscosity 6000 cP in the form of a 2% solution in $H_2O$ (Brookfield, 25°C) |
| Stream 3 | 1270.00 g/h | of vinyl chloride |
| Stream 4 | 770.00 g/h | of vinyl acetate |
| Stream 5 | 560.00 g/h | of ethylene. |

The solution of stream 2 has a viscosity of about 70 cP, as measured at 20°C in a Hoppler viscosimeter, corresponding to a flowout time of approximately 27 seconds from a DIN 53 211 cup with a 4 mm nozzle. The gas zone in the cyclone and in container 6 is kept at a temperature of approximately 50°C. Under these conditions, unreacted vinyl chloride and ethylene escape as gases and also entrain most of the unreacted vinyl acetate in the gas stream. Averaged out over a period of 1000 hours, crude dispersion is removed at a rate of 4440 g/h (solids content of the crude dispersion approximately 55 – 55.3%) and solids at a rate of approximately 2450 g/h.

Analysis of the polymer washed free from salt (on a washing cylinder):

| | |
|---|---|
| vinyl chloride units | 50.0 % by weight |
| vinyl acetate units | 28.2% by weight |
| ethylene units | 18.5% by weight |
| MCH units | 3.3% by weight |

The dispersion (approximately 54.5%), when freed from residual monomers by cyclone degassing, has an outflow time of approximately 14 seconds at 20°C from a DIN 53 211 cup with a 4 mm diameter nozzle.

EXAMPLE 2

(Dispersion 2)

The following quantitative streams are introduced into a 40 liter capacity fine-steel autoclave (working pressure 100 atms.) through a valve in its base at a temperature of 75°C/90 atms. pressure:

| | | |
|---|---|---|
| Stream 1 | 2300.00 g/h | of water |
| | 53.00 g/h | of sodium 2-N-acrylamido-2-methyl propane sulphonate (AMP) |

$$\text{AMP: } CH_2=CH-CONH-\underset{\underset{CH_3}{|}}{\overset{\overset{CH_3}{|}}{C}}-CH_2-SO_3^\ominus Na^\oplus$$

| | | |
|---|---|---|
| | 36.00 g/h | of a $C_{12}$–$C_{18}$ alkane sulphonate mixture (sodium salts) |
| | 20.00 g/h | of potassium per sulphate |
| | 25.00 g/h | of hydrolysed polyvinylacetate (degree of hydrolysis 88, viscosity: 4% aqueous solution at t = 20°C, approximately 7 cP) |
| | 20.00 g/h | of $NaHCO_3$ |
| Stream 2 | 2200.00 g/h | of vinyl chloride |
| Stream 3 | 800.00 g/h | of ethylene. |

Averaged out over a period of 1000 hours, the crude dispersion is removed at a rate of 4770 g/h (solids content of the crude dispersion 52.5 – 52.6%) and solids at a rate of 2507 g/h.

Analysis of the polymer when washed free from salt (on a washing cylinder):

| | |
|---|---|
| Vinyl chloride units | 76.3% by weight |
| ethylene units | 21.6% by weight |
| AMP units | 2.1% by weight. |

EXAMPLE 3

(Dispersion 3)

The test described in Example 1 was repeated with the following streams respectively replacing streams 3, 4, 5:

| | |
|---|---|
| Stream 3 | 1715.00 g/h of vinyl chloride |
| Stream 4 | 285.00 g/h of vinyl acetate |
| Stream 5 | 650.00 g/h of ethylene. |

Averaged out over a period of 600 hours, the crude dispersion is removed at a rate of 4305 g/h (solids content of the crude dispersion 54.1%) and solids at a rate of 2329 g/h.

Analysis of the polymer when washed free from salt (on a washing cylinder):

| | |
|---|---|
| vinyl chloride units | 66.7% by weight |
| vinyl acetate units | 10.6% by weight |
| ethylene units | 19.0% by weight |
| MCH units | 3.7% by weight |

EXAMPLE 4

(Dispersion 4)

The test described in Example 1 was repeated with the following streams respectively replacing streams 3,4,5:

| | |
|---|---|
| Stream 3 | 400.00 g/h of vinyl chloride |
| Stream 4 | 1600.00 g/h of vinyl acetate |
| Stream 5 | 600.00 g/h of ethylene. |

Averaged out over a period of 500 hours, the crude dispersion, which still contains considerable quantities (approximately 1% by weight) of monomeric vinyl acetate, is removed at a rate of 4410 g/h (solids content of the crude dispersion 54%) and solids at a rate of 2381 g/h.

Analysis of the polymer washed free from salt:

| | |
|---|---|
| vinyl chloride units | 14.8% by weight |
| vinyl acetate units | 60.8% by weight |
| ethylene units | 20.5% by weight |
| MCH units | 3.9% by weight |

EXAMPLE 5

(Dispersion 5)

The test described in Example 1 was repeated in the same way, except that stream 2 contained 50 g of the compound AMP (AMP: cf. Example 2) instead of 100 g of the sodium salt of maleic acid cyclohexyl semi ester.

Averaged out over a period of 500 hours, the crude dispersion was removed at a rate of 4410 g/h (solids content of the crude dispersion 54.4%) and solids at a rate of 2399 g/h.

Analysis of the polymer washed free from salt:

| | |
|---|---|
| Vinyl chloride units | 51.2% by weight |
| vinyl acetate units | 28.4% by weight |
| ethylene units | 18.3% by weight |
| AMP units | 2.1% by weight |

EXAMPLE 6

(Dispersion 6)

The test described in Example 1 was repeated in the same way, except that stream 2 contained 60 g of the compound ASE:

$$CH_3-CH=CH-\underset{\underset{O}{\|}}{C}-O-CH_2-CH_2-SO_3^\ominus Na^\oplus \quad (ASE)$$

instead of 100 g of the sodium salt of maleic acid cyclohexyl semi ester.

Averaged out over a period of 600 hours, the crude dispersion, which still contains approximately 1 to 1.1% of monomeric vinyl acetate, was removed at a rate of 4390 g/h (solids content of the crude dispersion 53.5 – 53.6%) and solids at a rate of 2351 g/h.

Analysis of the polymer when washed free from salt (washing cylinder):

| | |
|---|---|
| vinyl chloride units | 51.2% by weight |
| vinyl acetate units | 28.0% by weight |
| ethylene units | 18.4% by weight |
| ASE units | 2.4% by weight |

EXAMPLE 7

(Dispersion 7)

The test described in Example 1 was repeated in the same way, except that stream 2 contained 70 g of the compound

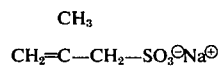

instead of 100 g of the sodium salt of maleic acid cyclohexyl semi ester.

Averaged out over a period of 500 hours, the crude dispersion, which still contained approximately 1.5% of monomeric vinyl acetate, was removed at a rate of 4200 g/h (solids content of the crude dispersion 51.4%) and solids at a rate of 2159 g/h.

Analysis of the polymer when washed free from salt:

| | |
|---|---|
| vinyl chloride units | 51.7% by weight |
| vinyl acetate units | 27.7% by weight |
| ethylene units | 17.5% by weight |
| methallyl sulphonic acid units | 3.1% by weight |

EXAMPLE 8

(Dispersion 8)

The test described in Example 2 was carried out in the same way, except that stream 1 contained 60 g of the disodium salt of maleic acid (MD) instead of 53.0 g of the sodium salt of 2-N-acrylamido-2-methyl propane sulphonic acid.

Averaged out over a period of 500 hours, the crude dispersion was removed at a rate of 4975 g/h (solids content of the crude dispersion 54.3%), and solids at a rate of 2701 g/h.

Analysis of the polymer when washed free from salt:

| | |
|---|---|
| vinyl chloride units | 76.77% |
| ethylene units | 21.71% |
| MD units | 1.52% |

EXAMPLE 9

(Dispersion 9) (Redox catalyst)

The following quantitative streams are introduced into a 40 liter capacity fine-steel autoclave (working pressure up to 100 atms.) through a valve in its base at a temperature of 50°C/75 atms. pressure:

| | | |
|---|---|---|
| Stream 1 | 200.00 g/h | of water |
| | 15.00 g/h | of ammonium peroxy disulphate |
| | 0.15 g.h | of iron (III) EDTE-complexonate (EDTE = ethylene diamine tetraacetic acid) |
| Stream 2 | 1800.00 g/h | of water |
| | 10.00 g/h | of NaHCO$_3$ |
| | 3.00 g/h | of sodium formaldehyde sulphoxylate |
| | 10.00 g/h | of sodium lauryl sulphate |
| | 10.00 g/h | of emulsifier CH$_3$—(CH$_2$)$_{11}$—O—(CH$_2$—CH$_2$—O)$_3$—SO$_3^\ominus$NH$_4^\oplus$ |
| | 8.00 g/h | of hydroxyethyl cellulose, degree of substitution 2.5 (300 cps for a 2% |

|          |            |                                                                    |
|----------|-----------:|--------------------------------------------------------------------|
|          |  50.00 g/h | aqueous solution at 25°C) of sodium 2-N-acrylamido-2-methyl propane sulphonic acid |
| Stream 3 | 1270.00 g/h | of vinyl chloride                                                 |
| Stream 4 |  770.00 g/h | of vinyl acetate                                                  |
| Stream 5 |  600.00 g/h | of ethylene.                                                      |

Streams 1 and 2 were combined immediately before the inlet valve into the autoclave. The solution on which stream 2 was based was cooled with cold water and freshly prepared every 10 hours.

Averaged out over a period of 400 hours, the crude dispersion, still containing approximately 1.4% of monomeric vinyl acetate, was removed at a rate of 4290 g/h (solids content of the crude dispersion: 52.7%), and solids at a rate of 2261 g/h.

Analysis of the copolymer when washed free from salt:

| vinyl chloride units |      49.13% |
|----------------------|-------------|
| vinyl acetate units  |      28.25% |
| ethylene units       | approx. 20.5 % |
| AMP units            | approx.  2.1 % |

EXAMPLE 10

(Dispersion 10)

The test described in Example 9 was carried out in the same way, except that the quantity of aqueous solutions and monomers pumped in and introduced per unit of time was doubled, without changing the type and concentrations of the reactants.

This measure produced a slight drop in the monomer conversion.

Averaged out over a period of 300 hours, the crude dispersion, still containing approximately 2% of monomeric vinyl acetate, was removed at a rate of 8500 g/h (solids content of the crude dispersion 51.9%), and solids at a rate of 4410 g/h.

Analysis of the copolymer washed free from salt:

| vinyl chloride units | 48.9% |
|----------------------|-------|
| vinyl acetate units  | 28.5% |
| ethylene units       | 20.5% |
| AMP units            |  2.1% |

COMPARISON EXAMPLES

The service properties of dispersions 11–14 are shown in Table VII.

COMPARISON EXAMPLE 1

(Dispersion 11)

The test described in Example 1 was carried out in the same way, except that no protective colloid was added to stream 2.

Although this did not have any effect upon the monomer conversion or upon the analytical composition of the polymer on which the dispersion was based, it did not produce a distinct difference between the stability of dispersion 11 and the stability of dispersion 1 (cf. Table VII).

COMPARISON EXAMPLE 2

(Dispersion 12)

The test described in Example 1 was carried out in the same way, except that no protective colloid or emulsifier was added to stream 2.

The test had to be terminated after only about 50 hours because coagulate had formed in the reactor, closing the walls of the reactor and blocking the pipes and valves carrying the latex.

COMPARISON EXAMPLE 3

(Dispersion 13)

The test described in Example 2 was carried out in the same way, except that no protective colloid was added to stream 1. Although this measure did not affect either the monomer conversion or the analytical composition of the copolymer on which the dispersion was based, it did produce a distinct difference between the stability of dispersion 13 and the stability of dispersion 2 (cf. Table VII)

COMPARISON EXAMPLE 4

(Dispersion 14)

The following comparison Example demonstrates that the above-mentioned measures do not result in the formation, in a batch process, of dispersions that are stable with respect to shear forces, storage and pigments.

The following components were introduced into a 40 liter capacity stainless steel pressure autoclave equipped with an anchor stirrer reaching down to its base (turning at 200 r.p.m.):

| water                   | 3500.00 g |
|-------------------------|-----------|
| MCH-sodium salt         |  147.00 g |
| NaHCO$_3$               |   29.20 g |
| Sodium lauryl sulphate  |   35.00 g |
| hydroxyethyl cellulose as in Example 1 | 31.10 g |

The autoclave was evacuated and subsequently gassed with ethylene. This operation was repeated 3 times. After heating to 70°C, the ethylene pressure was adjusted to 80 atms. (= 4500 g of ethylene). Thereafter the following quantitative streams were introduced (quantities per hour):

| Stream 1 | 200.00 g of water | addition time: 7 hours |
|----------|-------------------|------------------------|
|          | 20.00 g of ammonium persulphate | 30 minutes |
| Stream 2 | 1800.00 g of water | addition time: 5 hours |
|          | 110.00 g of MCH-sodium salt | 33 minutes |
|          | 15.00 g of NaHCO$_3$ | |
|          | 18.00 g of sodium lauryl sulphate | |
|          | 16.00 g of hydroxyethyl cellulose | |
| Stream 3 | 1270.00 g of vinyl chloride | addition time: 7 hours |
| Stream 4 | 770.00 g of vinyl acetate | 30 minutes |

In the first phase of polymerisation, ethylene had to be blown off periodically to keep the pressure constant. Thereafter, the pressure dropped and more ethylene had to be introduced. On completion of polymerisation, the contents of the autoclave were cooled to 40°C and the autoclave was vented.

A coarse-particulate dispersion containing specks and coagulate and having a solids content of 49.2% was obtained in a quantity of approximately 31.5 kg.

Analysis of the polymer when washed free from salt:

| | |
|---|---|
| vinyl chloride units | 48.4% |
| vinyl acetate units | 27.7% |
| ethylene units | 20.0% |
| MCH units | 3.9% |

Characterisation of the dispersions according to the invention and their potential applications a. Building protection sector Table VII shows that the dispersions prepared by the process according to the invention are highly stable with respect to shear forces, show high stability in storage, pigment compatibility and electrolyte stability. Their stability to freezing is also generally good to outstanding.

All the types produced in accordance with the comparison tests sediment and coagulate after a single freezing (cf. dispersions 11–14).

Table III shows a number of important data which characterise the dispersions according to the invention as eminently suitable binders for building protection. The following explanations apply to Table III:

The film-forming temperature was measured at 50% relative air humidity, and the wet-film thickness of the dispersions was fixed at 90 μ.

In order to determine the resistance of clear films produced from the dispersions to alkalis, asbestos cement panels (7 × 15 × 0.6) were coated on all sides with the particular dispersions (1 to 14) sufficiently thickly to produce a clear film coating approximately 100 μ thick. After drying for 1 week at room temperature, the coated panels were semi immersed in a bath filled with 10% sodium hydroxide solution and left standing for 12 weeks at room temperature. The panels were then removed from the bath, rinsed with water, dried and compared with the untreated half of the panel.

The assessment "good" applies when the coating retained its gloss, no film hazing occurred and no signs of film disintegration or discolouration were apparent; the assessment "moderate" applies when there were signs of hazing, but no signs of film dissolution.

The wet-scuffing resistance of the external and internal colours produced with the dispersions according to the invention was determined with a Gardner instrument on pigmented films (wet film thickness 200 μ) after drying for 28 days at 23°C/50% relative humidity, in order to assess resistance to washing.

The pigment volume concentration PVK is defined as $$PKV (\%) = \frac{V_P + V_F}{V_P + V_F + V_B} \cdot 100$$

$V_P$ = pigment volume, $V_F$ = filler volume, $V_B$ = volume of the solid binder (cf. Dispergieren synthetischer Hochpolymerer, Teil II, Hans Reinhard, page 46, (1969) Springer-Verlag-Berlin).

Table VII

| Dispersion | Stability to storage | Stability in storage (12 weeks at 40°C) | | | | Electrolyte stability | | AS Stability to freezing |
|---|---|---|---|---|---|---|---|---|
| | | AS | Interior paint 1 PVK 52 | Interior paint 2 PVK 60 | Exterior paint 3 PVK 76 | $Ca^{++}$ | $Al^{+++}$ | AS |
| 1 | good | + | + | + | + | + | + | unchanged after 20 C |
| 2 | good | + | + | + | + | + | + | specks after 5 C |
| 3 | good | + | + | + | + | + | + | specks after 10 C |
| 4 | good | + | + | + | + | + | + | unchanged after 20 C |
| 5 | good | + | + | + | + | + | + | unchanged after 20 C |
| 6 | good | + | + | + | + | + | + | specks after 10 C |
| 7 | specks after 10' | + | + | + | (+) | + | − | specks after 4 C |
| 8 | good | + | + | + | + | + | (+) | specks after 8 C |
| 9 | good | + | + | + | + | + | + | unchanged after 20 C |
| 10 | good | + | + | + | + | (+) | (+) | specks after 10 C |
| 11 | good | − | + | + | (+) | (+) | − | coagulation after 1 C |
| 12 | poor | − | − | − | − | + | + | coagulation after 1 C |
| 13 | good | − | + | (+) | (+) | + | − | coagulation after 1 C |
| 14 | poor | − | − | − | − | + | − | coagulation after 2 C |

Explanations to Table VII

Stability to shearing is good when the dispersion does not show any specks (micro coagulate) after stirring for 20 minutes with a high-speed stirrer (Klaxon stirrer, Model HM 5 UB, manufactured by Messrs. Klaxon Ltd., Warwick Road, Birmingham) [14000r.p.m. φ 20 mm], and poor when the dispersion coagulates during this treatment. Stability of the dispersion (as supplied: AS) is good (symbol +) when no sediment is formed, but poor ( − ) otherwise. The stability of the paint in storage is good when no thickening occurs during warm storage (symbol +), adequate when only slight thickening occurs [symbol (+)]; and poor ( − ) when the paint thickens. Electrolyte stability is good when the dispersion can be diluted with an equal volume of 10% $CaCl_2$ or $Al_2(SO_4)_3$ - solution without coagulation occurring (symbol +), adequate [symbol (+)] when up to 50% of the volume of the dispersion of electrolyte solution can be added, and poor ( − ) when even small additions result in immediate coagulation. Stability to freezing: Z = number of cycles (1 cycle = 1 change from +5° to −20°C).

3 recipes, which have proved to be effective over several years' observation, are set out in the following, recipe 2 of an exterior paint having shown no disadvantages in relation to recipe 1.

| | Exterior paint 1 | Exterior paint 2 | Interior paint 3 |
|---|---|---|---|
| I. | | | |
| Water | — | 20 | 20 |
| Sodium hexametaphosphate, 10% in water | 7 | 7 | 7 |
| NaOH, 10% in water | 7 | 7 | 7 |
| Borax | 5 | 5 | 5 |
| Standard antifoam agent, | | | |

-continued

|  | Exterior paint 1 | Exterior paint 2 | Interior paint 3 |
|---|---|---|---|
| 10% in water, based on natural fatty and oxethylated stearyl alcohol | 9 | 9 | 9 |
| Standard anti-corrosion additive based on amines | 3 | 3 | 3 |
| 3-methyl-4-chlorophenol, 25% in methanol/water 1:1 | 5 | 5 | 5 |
| Water-soluble cellulose methyl ether, 2% in water | 110 | 110 | 110 |
| II. | | | |
| Titanium dioxide | 114 | 76 | 60 |
| Extra-fine talcum | 19 | 19 | 100 |
| Ca-MgCO$_3$ 20 $\mu$ | 198 | 236 | 300 |
| Heavy spar | 38 | 38 | — |
| Chalk | 11 | 11 | — |
| III. | | | |
| Dispersions 1–14 according to the invention (50%) | 258 | 190 | 115 |
| Lacquer-grade petrol | 12 | 12 | 12 |
| Total parts by weight | 796 | 748 | 803 |
| Pigmenting level (based on binder) | 300% | 400% | 800% |
| PVK approx. | 52% | 60% | 76% |
| TiO$_2$ (based on total pigment) | 30% | 20% | 13% |
| Binder content of the finished dispersion approx. | 16.2% | 12.7% | 7.2% |
| Total water content of the finished dispersion approx. | 33% | 33% | 32% |

To prepare the respective paints, I is initially introduced and II is dispersed while stirring with the dissolver at 1000 to 1500 r.p.m. After the required degree of grinding has been reached, the respective dispersions III are added and homogeneously admixed with the stirrer rotating at a l1w speed (approximately 400 to 500 r.p.m.) If it is desired to use solvents or plasticisers, they are added last of all to the finished dispersion with thorough stirring. The results are set out in Table VIII.

signs of abrasion after 1500 scuffing cycles. They were awarded the assessment moderate when signs of abrasion were noticeable after about 900 scuffing cycles.

In order to assess weathering behaviour, Eternit (Eternit = asbestos cement) panels (7 × 15,0,6) were coated on one side with exterior paint (PVK 60) in a layer thickness of about 150 $\mu$ and exposed to artificial weathering:

a. in a Sunshine Weatherometer XW, manufactured by Messrs. Atlas, Duisburg, Brabender Technologie, (Corex-D-Filter discs)

b. in the SMC Weatherometer manufactured by Messrs. Atlas, Duisburg (closed carbon-arc lamp with a Pyrex-D-Filter) in permanent light and with continuous spraying (using water of condensation) at 44°–48°C/100% relative humidity.

The samples weathered in the Sunshine Weatherometer XW did not show any signs of chalking, even after 800 hours.

The results set out in Table VIII thus relate to the test in the SMC-Weatherometer. The figures used have the following meaning:

0: no chalking
1: traces of chalking
2: average chalking
3: heavy chalking
4: thick, flour-like coating.

We claim:

1. A continuous process for producing an aqueous film-forming dispersion having a solids content of from 45 to 60% by weight wherein a mixture consisting of
   10 to 30% by weight of ethylene,
   20 to 89% by weight of vinyl chloride;
   0 to 69% by weight of vinyl acetate and
   1 to 6% by weight of at least one hydrophilic monomer containing at least one —SO$_3$Me, —O—SO$_3$Me, —COOMe or —CONH$_2$ group attached thereto through a carbon atom wherein Me is H, Na, K or NH$_4$, Table VIII

| Dispersion No. | Film-forming temperature | Clear-film quality | Alkali resistance | Scuffing test 52% PVK Exterior paint 1 | Scuffing test 60% PVK Exterior paint 2 | Scuffing test 76% PVK Interior paint 3 | Weatherometer behaviour 250 h | 400 h | 600 h | 800 h |
|---|---|---|---|---|---|---|---|---|---|---|
| 1 | 9–10 | clear, glossy, elastic | good | good | good | good | 0 | 0.5 | 1 | 1.5 |
| 2 | 19–21 | clear, hard | good | good | good | moderate | 0 | 1 | 1.5 | 2 |
| 3 | 16–17 | clear, hard tough | good | good | good | good | 0 | 1 | 1.5 | 1.5 |
| 4 | 2–3 | clear, soft | moderate | good | good | moderate | 0 | 0.5 | 2 | 2.5 |
| 5 | 9–11 | clear, glossy, elastic | good | good | good | good | 0 | 0.5 | 1 | 1.5 |
| 6 | 9–11 | clear, glossy, elastic | good | good | good | good | 0 | 0.5 | 1.5 | 2 |
| 7 | 14–16 | clear, glossy, tough | good | good | good | good | 0 | 0.5 | 1 | 2 |
| 8 | 19–21 | clear, hard | good | good | good | moderate | 0 | 1.5 | 2 | 3 |
| 9 | 5–7 | clear, glossy, elastic | good | good | good | good | 0 | 0.5 | 1 | 1 |
| 10 | 6–8 | clear, glossy, elastic | good | good | good | good | 0 | 0.5 | 1 | 2 |
| 11 | 10–11 | clear, glossy, elastic | good | good | good | good | 0 | 0.5 | 0.5 | 1 |
| 12 | 10–12 | speckled, hazy | film dissolves | poor | poor | poor | — | — | — | — |
| 13 | 20–21 | clear, hard | good | good | good | moderate | 0 | 1 | 1 | 2.5 |
| 14 | 8–9 | speckled, hazy | moderate | good | moderate | poor | 1 | 1.5 | 2 | 3 |

All the exterior paints produced with the dispersions according to the invention proved to be resistant both to washing and scuffing. The pigmented paints were awarded the assessment good when there were still no is copolymerized in an aqueous dispersion in at least one reactor at a pH of from 3.5 to 8.5, at a temperature of from 40° to 80°C and under a pressure of from 50 to 200 atmospheres, the copolymerization of the monomers being carried out with intimate mixing in the presence of a. 0.5 to 2.5% by weight of at least one anionic emulsifier, based on the quantity of water introduced per unit of time;

b. 0.05 to 1.5% by weight of at least one protective colloid, based on the quantity of water introduced per unit of time and c. 0.1 to 2.5% by weight of at least one radical-forming initiator selected from the group consisting of (i) a water soluble peroxide and (ii) a redox system containing a water soluble peroxide and a water soluble reducing agent, based on the quantity of water introduced per unit of time, said temperature being from 60° to 80°C. when (i) is the radical-forming initiator and from 40 up to 70°C. when (ii) is the initiator and the ratio by weight of said peroxide compound to said reducing agent in (ii) being adjusted so that there is from 0.025 to 0.05% by weight of said peroxide compound in finished dispersion and d. the average residence time, defined as the ratio between the quantity by weight of reaction mixture in the reactor and the quantity by weight of reaction mixture removed per hour being from 2 to 30 hours;

e. the ratio by weight of the quantity of ethylene introduced per unit of time to the total quantity of monomers introduced per unit of time, including ethylene being from 0.1:1 to 0.65:1;

f. the ratio by weight of the total quantity of vinyl chloride and vinyl acetate introduced per unit of time to the total quantity of water introduced per unit of time being from 0.5:1 to 1.5:1 and g. the ratio of volume of dispersion in the reactor to total reactor volume being from 0.5:1 to 0.99:1.

2. The process of claim 1 in which the polymerization mixture contains other polymerization aids.

3. The process of claim 1 in which the polymerization takes place in at least one continuously traversed reactor or reaction tube.

4. The process of claim 1 in which the average residence time is from 5 to 10 hours.

5. The process of claim 1 in which the ratio of ethylene to total quantity of monomers is from 0.15:1 to 0.45:1.

6. The process of claim 1 in which the ratio of vinyl chloride and vinyl acetate to total quantity of water is from 0.8:1 to 1.2:1.

7. The process of claim 1 in which the ratio of volume of dispersion to total reactor volume is from 0.7:1 to 0.95:1.

8. An aqueous film-forming dispersion produced by the process of claim 1.

9. A paint containing, as pigment binder, a dispersion of claim 8.

* * * * *